(12) United States Patent
Kobayashi et al.

(10) Patent No.: US 6,303,072 B1
(45) Date of Patent: Oct. 16, 2001

(54) PROCESS OF MAKING AN ENDLESS BELT

(75) Inventors: Hiroyuki Kobayashi, Fuji; Minoru Shimojo, Kawasaki; Akihiko Nakazawa; Akira Shimada, both of Shizuoka-ken; Atsushi Tanaka, Susono; Tsunenori Ashibe, Yokohama; Takashi Kusaba, Shizuoka-ken; Hidekazu Matsuda, Numazu, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,154

(22) Filed: Jul. 27, 1999

(30) Foreign Application Priority Data

Jul. 28, 1998 (JP) .................................................. 10-212729
Dec. 25, 1998 (JP) .................................................. 10-370192

(51) Int. Cl.$^7$ ........................... B29C 47/00; B29C 47/06; B29C 47/20
(52) U.S. Cl. .................... 264/564; 264/150; 264/171.26; 264/171.27; 264/209.1
(58) Field of Search ........................ 264/150, 171.26, 264/171.27, 209.1, 564

(56) References Cited

U.S. PATENT DOCUMENTS

| | | | |
|---|---|---|---|
| 4,698,196 | * | 10/1987 | Fabian .............................. 264/150 X |
| 5,258,154 | * | 11/1993 | Okuyama et al. ................ 264/150 X |

FOREIGN PATENT DOCUMENTS

| | | |
|---|---|---|
| 63-301960 | 12/1988 | (JP) . |
| 3-89357 | 4/1991 | (JP) . |
| 5-77252 | 3/1993 | (JP) . |
| 5-269849 | 10/1993 | (JP) . |
| 5-345368 | 12/1993 | (JP) . |
| 9-269674 | 10/1997 | (JP) . |

* cited by examiner

Primary Examiner—Leo B. Tentoni
(74) Attorney, Agent, or Firm—Fitzpatrick, Cella, Harper & Scinto

(57) ABSTRACT

A process for producing an endless belt includes melt-extruding an extrusion material into a cylinder by means of an extruder, where the extrusion material has a tensile break strength of 400 kgf/cm$^2$ or above and a breaking extension of from 3.0% to 250%, and where the extrusion material is extruded in an extrusion ratio of from 1.05 to 2.80 while a gas is blown into the inside of the melt-extruded cylindrical product.

8 Claims, 5 Drawing Sheets

DOUBLE-LAYER ENDLESS BELT (PARTIAL)

TRIPLE-LAYER ENDLESS BELT (PARTIAL)

TRIPLE-LAYER ENDLESS BELT

PROCESS OF MAKING AN ENDLESS BELT

BACKGROUND OF THE INVENTION

1. Field of the Invention

This invention relates to a process for producing an endless belt, and more particularly, to a process for producing an endless belt used in, e.g., intermediate transfer members and transfer material carrying members for electrophotography. This invention also relates to an image forming apparatus having an endless belt formed by such production process.

2. Related Background Art

Compared with image forming apparatus in which images are transferred from a first image bearing member to a second image bearing member (transfer material) fastened or attracted onto a transfer drum (Japanese Patent Application Laid-open No. 63-301960), image forming apparatus making use of intermediate transfer belts have an advantage that a variety of second image bearing members can be selected without regard to their width and length, including thin paper (40 g/m$^2$ paper) and up to thick paper (200 g/m$^2$ paper) such as envelopes, post cards and labels. This is because any processing or control (e.g., the transfer material is held with a gripper, attracted, and made to have a curvature) is not required for the second image bearing member transfer material.

Because of such an advantage, color copying machines and color printers making use of intermediate transfer belts have already begun to be available in the market.

Color image forming apparatus are also proposed which have a plurality of recording assemblies in which electrostatic latent images are formed on photosensitive members, the electrostatic latent images formed are developed and the developed images are transferred to a transfer material, where a color image is formed by transferring individual color images superimposingly to the transfer material while transporting it successively to the respective recording assemblies by means of a transfer material carrying member (transfer belt). Such image forming apparatus have an advantage that images can be reproduced in a short time because the color image is formed through one step.

Because of such an advantage, color copying machines and color printers making use of transfer belts have already begun to be available in the market.

Various processes for producing such intermediate transfer belts and transfer belts are already known in the art. For example, Japanese Patent Application Laid-open No. 3-89357 and No. 5-345368 disclose a process for producing a semiconducting belt by extrusion.

Japanese Patent Application Laid-open No. 5-269849 also discloses a process in which a belt is obtained by joining both ends of a sheet to bring it into a cylindrical form. Japanese Patent Application Laid-open No. 9-269674 discloses a process in which a belt is obtained by forming a multi-layer coating film on a cylindrical substrate and finally removing the substrate. Meanwhile, Japanese Patent Application Laid-open No. 5-77252 discloses a seamless belt obtained by centrifugal molding.

For example, in the extrusion, the production of an endless belt having a thickness of 100 μm or smaller involves considerable difficulties, tending to cause uneven wall thickness and uneven electrical resistance. Also, in the case when both ends of a sheet are joined, the difference in height and decrease in tensile strength at the joint come into question. Still also, processes making use of solvents as in cast molding, coating and centrifugal molding require many steps of preparing a coating solution, coating it and removing the solvent, resulting in a high cost.

SUMMARY OF THE INVENTION

An object of the present invention is to provide a process for producing an endless belt which can make the life of photosensitive members longer and can be rich in variety, and which process can enjoy a low cost, having a small number of steps.

Another object of the present invention is to provide a process for producing an endless belt which does not cause any faulty transfer of very small image areas (i.e., blank areas caused by poor transfer) and enables formation of good images without dependence on the type of paper or OHP sheet, the second image bearing member, and also to provide an image forming apparatus having an endless belt obtained by such a production process.

The present invention provides a process for producing an endless belt comprising the step of melt-extruding an extrusion material into a cylinder by means of an extruder; the extrusion material being a material having a tensile break strength of 400 kgf/cm$^2$ or above and a breaking extension of from 3.0% to 250%, and being extruded in an extrusion ratio of from 1.05 to 2.80 by blowing a gas to the inside of the melt-extruded cylindrical product while being melt-extruded.

The present invention also provides an image forming apparatus having an endless belt produced by the process described above.

DESCRIPTION OF THE PREFERRED EMBODIMENTS

In the production process of the present invention, a material having a tensile break strength of 400 kgf/cm$^2$ or above and a breaking extension of from 3.0% to 250% is used as an extrusion material.

An embodiment of the present invention will be described below with reference to the drawings. This embodiment by no means limits the present invention.

Figure 1:
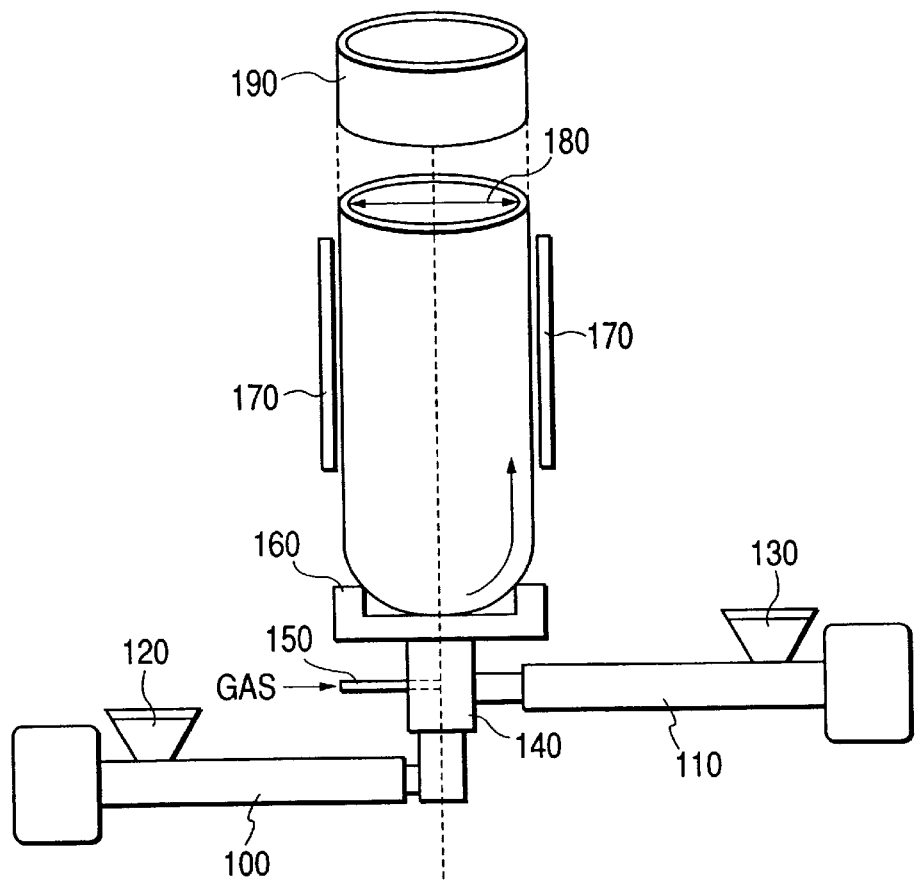
FIG. 1 illustrates an extrusion apparatus for producing the endless belt according to the present invention.

FIG. 1 shows an extrusion apparatus for producing the endless belt according to the present invention. This apparatus consists basically of an extruder, an extruder die and a gas blowing unit. As shown in FIG. 1, the apparatus has extruders 100 and 110 so that a belt of double-layer configuration can be extruded. In the present invention, however, at least one extruder may be provided.

A single-layer endless belt can be produced by a process described below. First, an extrusion resin, a conducting agent (resistance control agent) and additives are premixed under the desired formulation and thereafter kneaded and dispersed to prepare an extrusion material, which is then put into a hopper installed to the extruder 100. The extruder 100 has a preset temperature, extruder screw construction and so forth which have been so selected that the extrusion material may have a melt viscosity necessary for enabling the extrusion into an endless belt in the post step and also the materials constituting the extrusion material can be dispersed uniformly.

The extrusion material is melt-kneaded in the extruder 100 into a melt, which then enters an extruder die 140, and is extruded therefrom in a prescribed extrusion ratio. The extruder die 140 is provided with a gas inlet passage 150. Through the gas inlet passage 150, a gas is blown into the extruder die 140, whereupon the melt having passed through the extruder die 140 in a tubular form inflates while scaling up in the diametrical direction. The gas to be blown may be selected from air, nitrogen, carbon dioxide and argon.

The extruded product having thus inflated into a cylinder is drawn upward while being cooled by a cooling ring 160. At this stage, the extruded product passes through the space defined by a dimension stabilizing guide 170, so that its final shape and dimensions are determined. This product is further cut in desired width, thus an endless belt 190 of the present invention can be obtained.

The extrusion ratio referred to in the present invention is meant to be the ratio of the cylinder diameter corresponding to shape dimension 180 to the bore diameter of the extruder die 140, the former being that after extrusion where the extrusion material has passed through the extruder die and has inflated while scaling up in diameter.

More specifically, (extrusion ratio)=(cylindrical product diameter after extrusion)/(bore diameter of extruder die).

In the above formula, the cylindrical product diameter after extrusion denotes a value obtained by dividing an outer circumference of cylindrical film after extruded by pi($\pi$). The outer circumference is value as determined by cutting the film at one end and measuring its length with a slide caliper. Moreover, the bore diameter of extruder means the maximum diameter of an outer die of the die.

In the case when the endless belt of double-layer configuration is produced, an extruder 110 is provided in addition to the extruder 100 as shown in FIG. 1. Simultaneously with the kneaded melt in the extruder 100, a kneaded melt in the extruder 110 is sent to a double-layer extruder die 140, and the two layers are scale-up inflated simultaneously. Of course, in the case of triple- or more layers, the extruder and the extruder die may be provided in the number corresponding to the number of layers.

Figure 2:
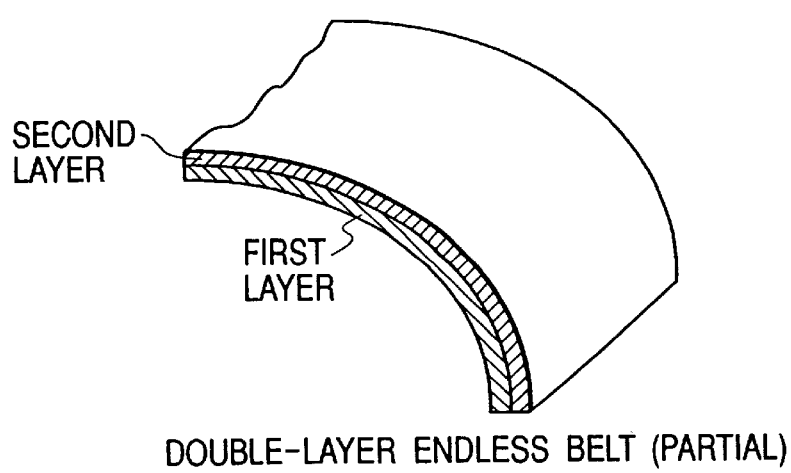
FIG. 2 schematically illustrates part of an endless belt having a double-layer configuration.
Figure 3:
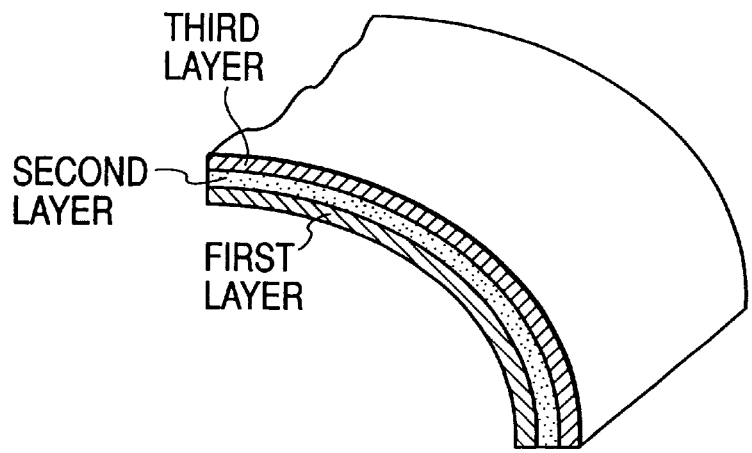
FIG. 3 schematically illustrates part of an endless belt having a triple-layer configuration.
Figure 4:
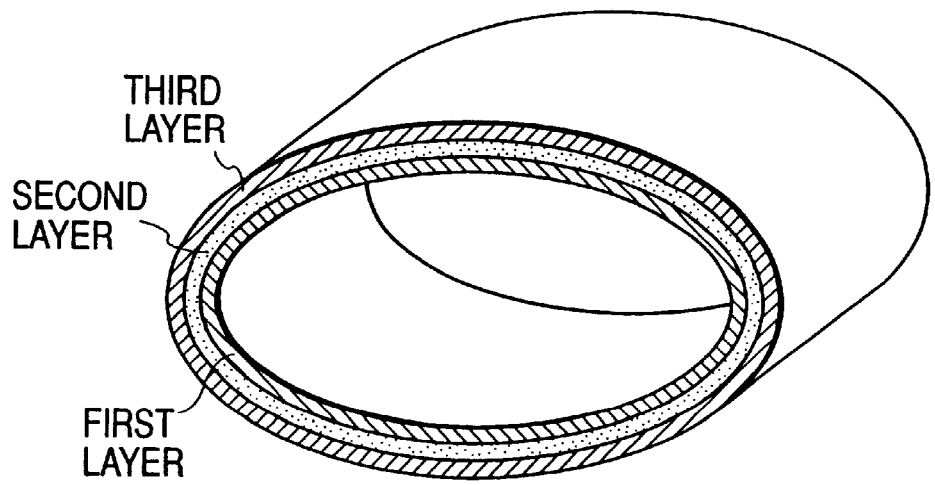
FIG. 4 schematically illustrates the whole of the endless belt having a triple-layer configuration.

Examples of the endless belt of double-layer configuration and that of triple-layer configuration are shown in FIGS. 2 to 4. Thus, the present invention makes it possible to extrude not only endless belts of single-layer configuration but also those of multi-layer configuration in a good dimensional precision through one step and also in a short time. The fact that the extrusion can be made in a good precision in a short time means that mass production and low-cost production can be made.

In the endless-belt production process of the present invention, after the extrusion, the cylindrical extruded product is scale-up inflated while the gas is blown to its inside to provide the desired dimensions, and hence the extrusion material is required to have properties adapted to such production process.

More specifically, if the material has a tensile break strength below 400 kgf/cm$^2$, the extruded product may have no body at the time of scale-up inflation and can not maintain the cylindrical shape, tending to case wrinkles, strain and unevenness when it is drawn upward while being scale-up inflated as shown in FIG. 1.

If the material has a breaking extension less than 3.0%, the extruded product may instantaneously solidify when it is shifted to a cooling step from a molten state after it has passed through the step of extrusion, so that it can not be scale-up inflated to the desired dimensions. On the other hand, an endless belt extruded using a material having a breaking extension more than 250% may become loose gradually during its repeated use over a long period of time.

In the case of multi-layer configuration, at least one layer may be formed by the production process of the present invention.

The tensile break strength and breaking extension referred to in the present invention are measured according to JIS K7113 and JIS K7127, in conformity with the nature of the extrusion material and the resin used in the extrusion material.

In the production process of the present invention, the uniformity of electrical resistance in the belt is greatly affected by the magnitudes of extrusion ratio. In the present invention, the extrusion material is extruded in an extrusion ratio of from 1.05 to 2.80.

If the extrusion ratio is more than 2.80, the extruded product may inflate at a too large scale-up percentage in the step of scale-up inflation after it has passed through the extruder die, to cause uneven electrical resistance in the draw-up direction (axial direction) and the peripheral direction. In particular, since the extruded product is instantaneously scaled up in the peripheral direction, it may have a great uneven electrical resistance in the peripheral direction.

If on the other hand the extrusion ratio is less than 1.05, it may be difficult to balance the rate of extrusion and the quantity and rate of gas blowing, tending to cause unstable shape and dimensions of the belt and unevenness of the belt in its wall thickness direction. The belt wall thickness is also a factor that affects the electrical resistance, and the uneven wall thickness may put a difficulty to the uniformity in the belt.

In the present invention, the extruded endless belt may preferably have a wall thickness smaller than the die gap of the circular die. This is because, when, e.g., a film of 150 $\mu$m thick is prepared under a die gap of 150 $\mu$m, an alteration of the die gap by 50 $\mu$m makes the film thickness change by 50 $\mu$m exactly but in fact it is difficult to adjust the die gap at intervals of 1 $\mu$m, so that films with uneven layer thickness tend to be formed. However, when, e.g., a film of 150 $\mu$m thick is prepared by expanding or drawing a film extruded from a die gap of 1.5 mm, even a difference of the die gap by 50 $\mu$m makes the film finally have a layer thickness deflection of $\frac{1}{10}$ and hence actually have a layer thickness deflection of 5 $\mu$m, so that films can finally be prepared in a high precision. Thus, the extruded endless belt may preferably have a wall thickness smaller than the die gap of the circular die.

As a method by which the extruded endless belt is made to have a wall thickness smaller than the die gap of the circular die, the film may be taken off at a speed higher than the discharge speed of the melt discharged through the circular die discharge end in a tubular form by extrusion of the extruder. For example, where the melt to be extruded in a tubular form from the die discharge end without film take-off is extruded at a speed of 1 m/min and the die has a bore diameter equal to the cylinder diameter of the film and also the take-off speed is 10 m/min, the film wall thickness comes to be 1/10 of the die gap of the circular die, thus the extruded endless belt can be made to have a wall thickness smaller than the die gap of the circular die.

The extruded endless belt can also be made to have a wall thickness smaller than the die gap of the circular die by controlling the extrusion ratio to be 1.05 or more. More specifically, the diameter of the extruded cylindrical film is made larger than the diameter of the die, whereby the film wall thickness becomes smaller correspondingly to its diameter made larger, even when the take-off speed is equal to the extrusion speed.

When cut in the desired width, the tubular film discharged by extrusion of the extruder from the circular die discharge end may preferably continuously be cut in prescribed length in the direction perpendicular to its lengthwise direction. This is because, when cut continuously, cutting in the state the cutter blade is stopped may produce a time difference between the beginning of cut and the finish of cut, so that the tubular film is obliquely cut, making it necessary for the cut film to be again cut when worked into the endless belt. As a method by which the tubular film is continuously cut in the direction perpendicular to its lengthwise direction, a cutter may be used which moves in the direction of extrusion at the same speed as the tube extrusion speed, but not limited to this.

The endless belt obtained after extrusion may preferably have a wall thickness in the range of from 45 to 300 $\mu$m, particularly from 50 to 270 $\mu$m, and more preferably from 55 to 260 $\mu$m. In the present invention, the kneaded melt extruded in a tubular form from the extruder die inflates while scaling up abruptly, and hence the wall thickness of the extruded product is restricted to a certain extent together with the controllability of electrical resistance.

In a wall thickness larger than 300 $\mu$m, uniform scale-up inflation may be made with difficulty to tend to cause a difficulty in the uniformity of electrical resistance, simultaneously making it difficult to attain uniform wall thickness. Also, when the endless belt having such a large wall thickness is used as an intermediate transfer member or a transfer material carrying member, it may smoothly travel with difficulty because of a too high rigidity and a poor flexibility, to tend to cause deflection or torsion.

In a wall thickness smaller than 45 $\mu$m, problems tend to occur such that the endless belt becomes loose during service to cause elongation gradually. The employment of the production process of the present invention enables production of even a thin-layer belt of smaller than 45 $\mu$m thick and also enables achievement of well superior stability in electrical resistance, too. However, such a wall thickness is not preferred because of the above problems.

The resin (extrusion resin) which is the chief material of the extrusion material used in the present invention may include, e.g., styrene resins (homopolymers or copolymers containing styrene or substituted styrene) such as polystyrene, polychlorostyrene, poly-α-methylstyrene, styrene-butadiene copolymer, styrene-vinyl chloride copolymer, styrene-vinyl acetate copolymer, styrene-maleic acid copolymer, styrene-acrylate copolymers (such as styrene-methyl acrylate copolymer, styrene-ethyl acrylate copolymer, styrene-butyl acrylate copolymer, styrene-octyl acrylate copolymer and styrene-phenyl acrylate copolymer), styrene-methacrylate copolymers (such as styrene-methyl methacrylate copolymer, styrene-ethyl methacrylate copolymer and styrene-phenyl methacrylate copolymer), styrene-α-methyl chloroacrylate copolymer and styrene-acrylonitrile-acrylate copolymer, methyl methacrylate resin, butyl methacrylate resin, ethyl acrylate resin, butyl acrylate resin, modified acrylic resins (such as silicone-modified acrylic resin, vinyl chloride resin modified acrylic resin and acryl-urethane resin), vinyl chloride resin, vinyl chloride-vinyl acetate copolymer, rosin-modified maleic acid resin, phenol resins, epoxy resins, polyester resins, polyester polyurethane resins, polyethylene, polypropylene, polybutadiene, polyvinylidene chloride, ionomer resins, polyurethane resins, silicone resins, fluorine resins, ketone resins, ethylene-ethyl acrylate copolymer, xylene resins, polyvinyl butyral resins, polyimide resins, polyamide resins, and modified polyphenylene oxide resins. One or more types selected from the group consisting of these may be used. Examples are by no means limited to the foregoing materials.

Of resistance control agents for adjusting the value of electrical resistance which are used in extrusion materials, electronic conductive resistance control agents may include, e.g., carbon black, graphite, aluminum-doped zinc oxide, tin-oxide-coated titanium oxide, tin oxide, tin-oxide-coated barium sulfate, potassium titanate, aluminum metal powder and nickel metal powder. Ionic conductive resistance control agents may include, e.g., tetraalkylammonium salts, trialkylbenzyls, ammonium salts, alkyl sulfonates, alkylbenzene sulfonates, alkyl sulfates, glycerol fatty acid esters, sorbitan fatty acid esters, polyoxyethylene alkylamines, polyoxyethylene fatty alcohol esters, alkylbetaines and lithium perchlorate.

Figure 5:
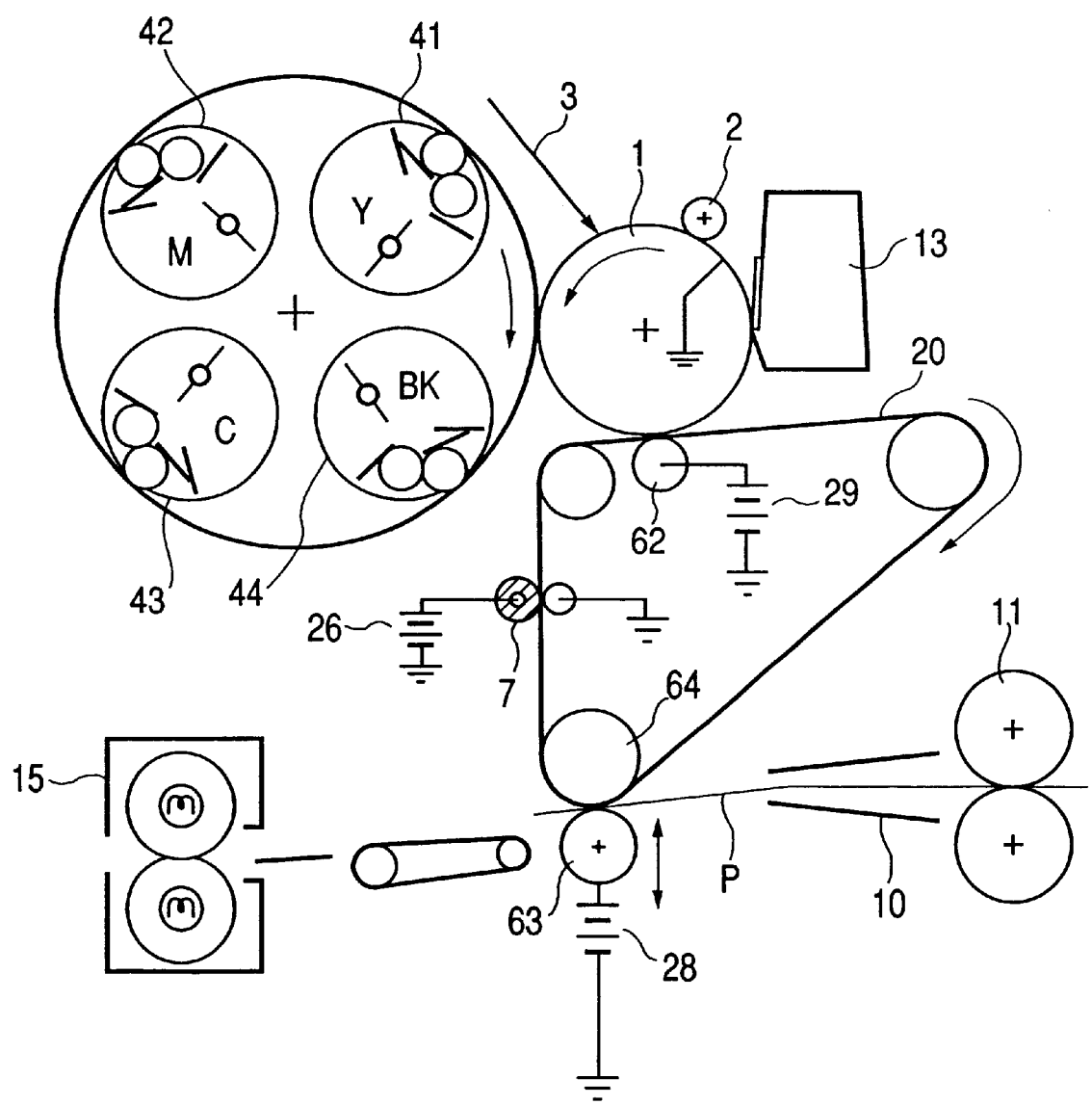
FIG. 5 schematically illustrates an example of an image forming apparatus making use of the endless belt of the present invention as an intermediate transfer member.

An example of a color image forming apparatus (copying machine or printer) employing as an intermediate transfer member the endless belt obtained by the present invention is schematically shown in FIG. 5.

Reference numeral 1 denotes a drum-shaped electrophotographic photosensitive member (hereinafter "photosensitive drum") serving as a first image bearing member, which is rotatingly driven at a prescribed peripheral speed (process speed) in the direction of the arrow. The photosensitive drum 1 is, in the course of its rotation, uniformly charged to prescribed polarity and potential by means of a primary charging assembly 2, and then exposed to light 3 by a exposure means (not shown; e.g., a color-original image color-separating/image-forming optical system, or a scanning exposure system comprising a laser scanner that outputs laser beams modulated in accordance with time-sequential electrical digital pixel signals of image information). Thus, an electrostatic latent image is formed which corresponds to a first color component image (e.g., a yellow color component image) of the intended color image.

Next, the electrostatic latent image is developed with a first-color, yellow toner Y, by means of a first developing assembly (yellow color developing assembly 41). At this stage, second to fourth developing assemblies (magenta color developing assembly 42, cyan color developing assembly 43 and black color developing assembly 44) each stand unoperated and do not act on the photosensitive drum 1, and hence the first-color yellow toner image is not affected by the second to fourth developing assemblies.

An intermediate transfer belt 20 is rotatingly driven at a prescribed peripheral speed in the direction of the arrow. The first-color yellow toner image formed and held on the photosensitive drum 1 passes through a nip formed between the photosensitive drum 1 and the intermediate transfer belt 20, in the course of which it is successively intermediately transferred to the periphery of the intermediate transfer belt 20 (primary transfer) by the aid of an electric field formed by a primary transfer bias applied to the intermediate transfer belt 20 through a primary transfer roller 62. The photosensitive drum 1 surface from which the first-color yellow toner image has been transferred is cleaned by a cleaning assembly 13.

Subsequently, the second-color magenta toner image, the third-color magenta toner image and the fourth-color black toner image are sequentially similarly transferred superimposingly onto the intermediate transfer belt 20. Thus, the intended full-color image is formed.

Reference numeral 63 denotes a secondary transfer roller, which is provided in such a way that it is axially supported in parallel to a secondary transfer opposing roller 64 and stands separable from the bottom surface of the intermediate transfer belt 20. The primary transfer bias for sequentially superimposingly transferring the first- to fourth-color toner images from the photosensitive drum 1 to the intermediate transfer belt 20 is applied from a bias source 29 in a polarity (+) reverse to that of each toner. The voltage thus applied is, e.g., in the range of from +100 V to +2 kV. In the step of primary transfer, the secondary transfer roller 63 may also be set separable from the intermediate transfer belt 20.

The full-color toner images formed on the intermediate transfer belt 20 are transferred to a second image bearing member, transfer material P, in the following way: The secondary transfer roller 63 is brought into contact with the intermediate transfer belt 20 and simultaneously the transfer material P is fed at a prescribed timing from a paper feed roller 11 through a transfer material guide 10 until it reaches a contact nip formed between the intermediate transfer belt 20 and the secondary transfer roller 63, where a secondary transfer bias is applied to the secondary transfer roller 63 from a power source 28. The transfer material P to which the toner images have been transferred are guided into a fixing assembly 15 and are heat-fixed there.

After the toner images have been transferred to the transfer material P, a charging member 7 for cleaning is brought into contact with the intermediate transfer belt 20, and a bias with a polarity reverse to that of the photosensitive drum 1 is applied, whereupon electric charges with a polarity reverse to that of the photosensitive drum 1 are imparted to toners not transferred to the transfer material P and remaining on the intermediate transfer belt 20 (i.e., transfer residual toners). Reference numeral 26 denotes a bias power source. The transfer residual toners are electrostatically transferred to the photosensitive drum 1 at the nip on the photosensitive drum 1 and the vicinity thereof, thus the intermediate transfer member (intermediate transfer belt 20) is cleaned.

Figure 6:
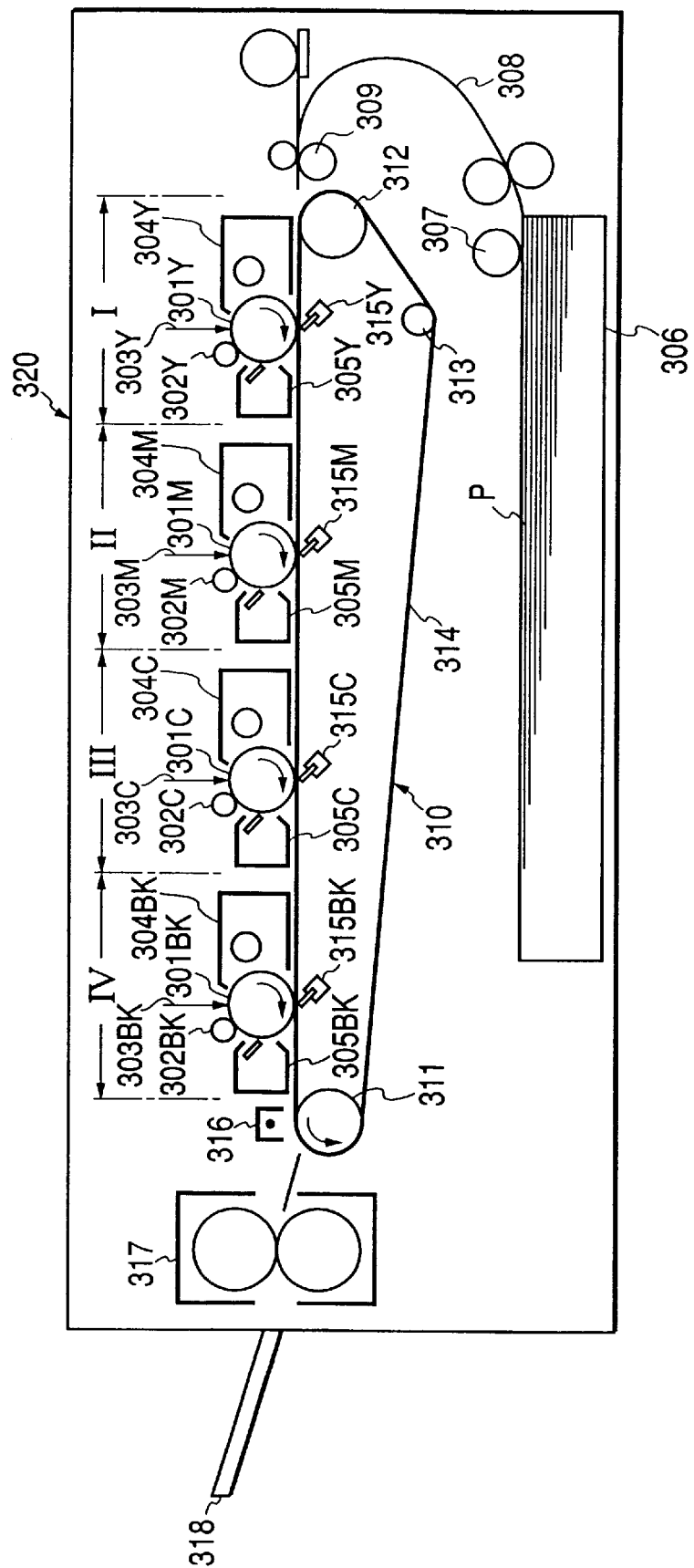
FIG. 6 schematically illustrates an example of an image forming apparatus making use of the endless belt of the present invention as a transfer member.

An example of a color image forming apparatus employing as a transfer belt (transfer material carrying member) the endless belt obtained by the present invention is schematically shown in FIG. 6.

The image forming apparatus shown in FIG. 6 is an apparatus in which different color toner images are respectively formed on a plurality of photosensitive members, and the toner images on the respective photosensitive members are transferred, under registration, to a single sheet of transfer material transported in sequential contact with the respective photosensitive members, thus a full-color image is obtained.

The image forming apparatus shown in FIG. 6 comprises four image forming sections I, II, III and IV arranged side by side at the upper part of an apparatus main body 320. The image forming sections I, II, III and IV are respectively constituted of photosensitive drums 301Y, 301M, 301C and 301BK as image bearing members, primary charging rollers 302Y, 302M, 302C and 302BK as primary charging assemblies, exposure means for applying exposure light 303Y, 303M, 303C and 303BK, developing assemblies 304Y, 304M, 304C and 304BK, and cleaners 305Y, 305M, 305C and 305BK. The developing assemblies 304Y, 304M, 304C and 304BK hold a yellow (Y) toner, a magenta (M) toner, a cyan (C) toner and a black (BK) toner, respectively.

A transfer assembly 310 is also provided at the lower part of the image forming sections I to IV. The transfer assembly 310 is constituted of an endless transfer belt 314 of the present invention, provided stretchingly across a drive roller 311, a follower roller 312 and a tension roller 313, and transfer charging assemblies 315Y, 315M, 315C and 315BK provided opposingly to the photosensitive drums 301Y, 301M, 301C and 301BK of the image forming sections I, II, III and IV, respectively.

Meanwhile, at the bottom of the apparatus main body 320, a cassette 306 is provided in which a multiple sheet of transfer materials P can superposingly be held as recording mediums. The transfer material P held in the cassette 306 are sheet by sheet sent out by a paper feed roller 307, and are transported to a resist roller 309 through a transport guide 308.

A separation charging assembly 316 and a fixing assembly 317 are provided on the downstream side in the transport direction of the transfer material P in the apparatus main body 320, and a paper output tray 318 is installed on the outside of the apparatus main body 320.

In the image forming sections I, II, III and IV, the photosensitive drums 301Y, 301M, 301C and 301BK are rotatingly driven at a prescribed speed in the direction of an arrow, and these are uniformly charged by means of the primary charging rollers 302Y, 302M, 302C and 302BK, respectively. The photosensitive drums 301Y, 301M, 301C and 301BK thus charged are exposed to exposure light 303Y, 303M, 303C and 303BK, respectively, in accordance with image information, whereupon electrostatic latent images are formed on the respective photosensitive drums 301Y, 301M, 301C and 301BK. The electrostatic latent images are developed by means of the developing assemblies 304Y, 304M, 304C and 304BK to become visible images as a yellow toner image, a magenta toner image, a cyan toner image and a black toner image, respectively.

Meanwhile, the transfer material P transported to the resist roller 309 through the transport guide 308 is sent out to the transfer assembly 310 by the resist roller 309 under timing, and is then attracted to the transfer belt 314 and passed through the respective image forming sections I, II, III and IV together with the belt, in the course of which the yellow toner image, the magenta toner image, the cyan toner image and the black toner image are superimposingly transferred to the transfer material P by the operation of the transfer charging assemblies 315Y, 315M, 315C and 315BK, respectively.

Then, the transfer material P to which the color toner images have been transferred as described above is destaticized by the separation charging assembly 316 to become separated from the transfer belt 314, and thereafter transported to the fixing assembly 317, where the color toner images are heat-fixed to form a full-color image. The transfer material P with the full-color image is finally put out of the apparatus main body 320, and overlaid on the paper output tray 318.

The endless belt used in the present invention may preferably have a volume resistance of from $10^0$ to $10^{14}$ Ω, and particularly preferably from $10^6$ to $10^{12}$ Ω. It may also preferably have a surface resistance of from $10^0$ to $10^{17}$ Ω, and particularly preferably from $10^6$ to $10^{14}$ Ω.

If the endless belt has a too high electrical resistance, a sufficient transfer electric field can not be imparted at the time of transfer, tending to result in faulty transfer. If on the other hand it has a too low electrical resistance, electrical discharge may locally occur, also making it hard to form the transfer electric field. Also, if the resistance in the belt is non-uniform, the local electrical discharge, i.e., leak may occur like the above, and electric currents applied at the time of transfer may escape therethrough to make it hard to obtain the necessary transfer electric field.

In the present invention, the volume resistance and the surface resistance do not indicate mere difference in conditions of measurement, but indicate quite different electrical characteristics. When voltage and current to be applied to the endless belt are applied in the wall thickness direction, the movement of electric charges in the endless belt is chiefly determined by the endless belt internal structure, in other words, the layer configuration of the endless belt and the types and dispersion state of additives and resistance control agents therein. As the result thereof, the surface potential, charge elimination rate and so forth of the endless belt are determined. On the other hand, when the voltage and current are so applied that electric charges are given and received only on the surface of the endless belt, charging and charge eliminating characteristics are determined only depending on the proportion of presence of additives or resistance control agents on the surface, almost without depending on the endless belt internal structure. In the present invention, however, it is a preferable condition that these two resistances are both brought into the preferable ranges, in order not to cause any non-uniform transfer and filming.

In the present invention, it is also preferable that maximum values of volume resistance and surface resistance are within 100 times their minimum values at every area of the endless belt.

If the maximum value of volume resistance in the peripheral direction of the endless belt is greater than 100 times its minimum value, uneven transfer may occur in the peripheral direction, or, when voltage is applied at a plurality of spots, electric current may flow from some voltage-applied spots into other voltage-applied spots through areas having a low resistance in the peripheral direction, so that the disorder of voltage control at such other spots may make any normal operation impossible.

If the maximum value of surface resistance in the peripheral direction of the endless belt is greater than 100 times its minimum value, uneven transfer may also occur in the peripheral direction, or, when voltage is applied at a plurality of spots, electric current may flow from some voltage-applied spots into other voltage-applied spots through areas having a low resistance in the peripheral direction, so that the disorder of voltage control at such other spots may make any normal operation impossible.

If the maximum value of volume resistance in the lengthwise (or axial) direction of the endless belt is greater than 100 times its minimum value, uneven transfer may occur in the lengthwise direction, or excessive electric current may flow into portions having minimum resistance, bringing about a possibility of faulty operation of the apparatus.

If the maximum value of surface resistance in the lengthwise direction of the endless belt is greater than 100 times its minimum value, uneven transfer may also occur in the lengthwise direction, or, when the cleaning method is used in which stated electric charges are imparted to transfer residual toners to return them onto the photosensitive drum, excessive electric current may flow from the charge-providing charging member into portions having minimum surface resistance, so that any sufficient electric field can not be applied to such areas in their lengthwise direction, and hence uneven cleaning may occur in the lengthwise direction.

The electrical resistance of the endless belt of the present invention is measured in the following way.

Measuring Machine

Resistance meter: Ultra-high resistance meter R8340A (manufactured by Advantest Co.)

Sample box: Sample box TR42 for ultra-high resistance meter (manufactured by Advantest Co.)

Here, the main electrode is 25 mm in diameter, and the guard-ring electrode is 41 mm in inner diameter and 49 mm in outer diameter.

Sample

The belt is cut in a circular of 56 mm in diameter. After cutting, it is provided, on its one side, with an electrode over the whole surface by forming a Pt—Pd deposited film and, on the other side, provided with a main electrode of 25 mm in diameter and a guard electrode of 38 mm in inner diameter and 50 mm in outer diameter by forming Pt—Pd deposited films. The Pt—Pd deposited films are formed by carrying out vacuum deposition for 2 minutes using Mild Sputter E1030 (manufactured by Hitachi Ltd.). The one on which the vacuum deposition has been carried out is used as the sample.

Measurement Conditions

Measurement atmosphere: 23° C., 55% humidity. Here, the measuring sample is previously kept left in an atmosphere of 23° C. and 55% humidity for 12 hours or longer.

Measurement mode: Program mode 5 (discharge for 10 seconds, charge and measurement for 30 seconds)

Applied voltage: 1 to 1,000 V

The applied voltage may arbitrarily be selected within the range of from 1 to 1,000 V which is part of the range of the voltage applied to the intermediate transfer member and transfer material carrying member used in the image forming apparatus of the present invention. Also, the applied voltage used may appropriately be changed within the above range of applied voltage in accordance with the resistance value, thickness and breakdown strength of the sample. In the present invention, good results are obtained so long as the volume resistance and surface resistance at a plurality of spots, measured at any one-point voltage of the above applied voltage, are included in the above preferable resistance range.

The amount of the resistance control agent incorporated in the endless belt not only affects the resistance but also may affect the characteristics defined in the present invention. If the resistance control agent is in an amount more than 50% by weight based on the total weight of the belt, however the resin used is soft enough to be stretchable and expandable, the extrusion material may turn into a plastic melt after it has passed the extruder, tending to make it difficult to carry out the scale-up inflation as desired. Even if the scale-up inflation can be carried out, any granular structure, fish eyes and holes caused by particles of the resistance control agent tend to occur. Japanese Patent Applications Laid-open No. 3-89357 and No. 5-345368 refer to a conductive additive used in extrusion, but this extrusion is quite different from the extrusion with the blowing of air as in the present invention.

The above problems do not occur of course, if the resistance control agent is not used. Accordingly, the resin itself to be used as an extrusion material may preferably have the above preferable resistance.

However, in the present invention, the resistance control agent may preferably be in an amount not more than 50% by weight, particularly not more than 30% by weight, and more preferably not more than 21% by weight, based on the total weight of the belt. Incidentally, ionic conductive resistance control agents have a superior dispersibility but on the other hand has a great moisture dependence, and hence may preferably be used not in a large quantity. Also, electonic conductive resistance control agents tend to greatly affect the uniformity of electrical resistance. Accordingly, in the present invention, the ionic conductive resistance control agent may preferably be contained in an amount of from 0.05 to 10% by weight, and the electronic conductive resistance control agent in an amount of from 3 to 30% by weight.

In the present invention, the endless belt may preferably have a hardness of from 60 to 95 degrees, particularly from 70 to 95 degrees, and more preferably from 73 to 95 degrees, in view of transfer performance. The hardness is measured by a method prescribed in JIS-A.

In the present invention, the extrusion material may preferably have a water absorption of 1.9% or less. If it has a water absorption more than 1.9%, bubbles or granular structure containing water vapor tend(s) to occur on the belt surface at the time of belt extrusion. Especially when the extrusion ratio is more than 1.0 as in the present invention, the water absorption may preferably be controlled to be 1.6% or less.

The water absorption in the present invention is measured according to JIS-K7209. Here, the sample may have the shape of particles, film, a thin plate or a cube, any of which may appropriately selected within the range for ensuring reproducibility.

In the present invention, a photosensitive drum at least the outermost layer of which is incorporated with fluorine resin fine powder may be used as the first image bearing member. This is preferable because a higher primary transfer efficiency can be attained. This is presumably because the incorporation of fluorine resin fine powder makes the outermost layer of the photosensitive drum have a low surface energy, to improve the releasability of toner. The fluorine resin may include, e.g., polytetrafluoroethylene (PTFE) and polyvinylidene fluoride. In particular, polytetrafluoroethylene is preferred.

The present invention will be described below in greater detail by giving Examples. In the following Examples, "part(s)" is part(s) by weight.

EXAMPLE 1

| | |
|---|---|
| Polybutylene terephthalate resin | 70 parts |
| Polyethylene resin | 30 parts |
| Conductive carbon black | 8 parts |
| Antioxidant | 0.5 part |

The above materials were kneaded by means of a twin-screw extrusion kneader, and the additive such as carbon black was well uniformly dispersed in the resin so as to provide the desired electrical resistance, thus an extrusion material (1) was obtained. This material was further made into a kneaded product having particle diameters of 1 to 2 mm.

The tensile break strength and breaking extension of the extrusion material (1) were 590 kgf/cm$^2$ and 38%, respectively. Also, the water absorption of the extrusion material (1) was 0.09%.

Next, the above kneaded product was put into the hopper 120 of the single-screw extruder 100 shown in FIG. 1, and was extruded while controlling its preset temperature in the range of from 190 to 270° C., to form a melt. The melt was subsequently brought to an extrusion die 140 for extruding a cylindrical single-layer product of 150 mm diameter and 2 mm thick. Then, air was blown from the gas inlet passage 150 while the melt was extruded from the die, to scale-up inflate the extruded product into a cylindrical extruded product of 160 mm in diameter and 150 $\mu$m in wall thickness (extrusion ratio: 1.07) as final shape dimensions. This product was further cut in a belt width of 230 mm to obtain an intermediate transfer belt. This is designated as intermediate transfer belt (1).

Figure 7:
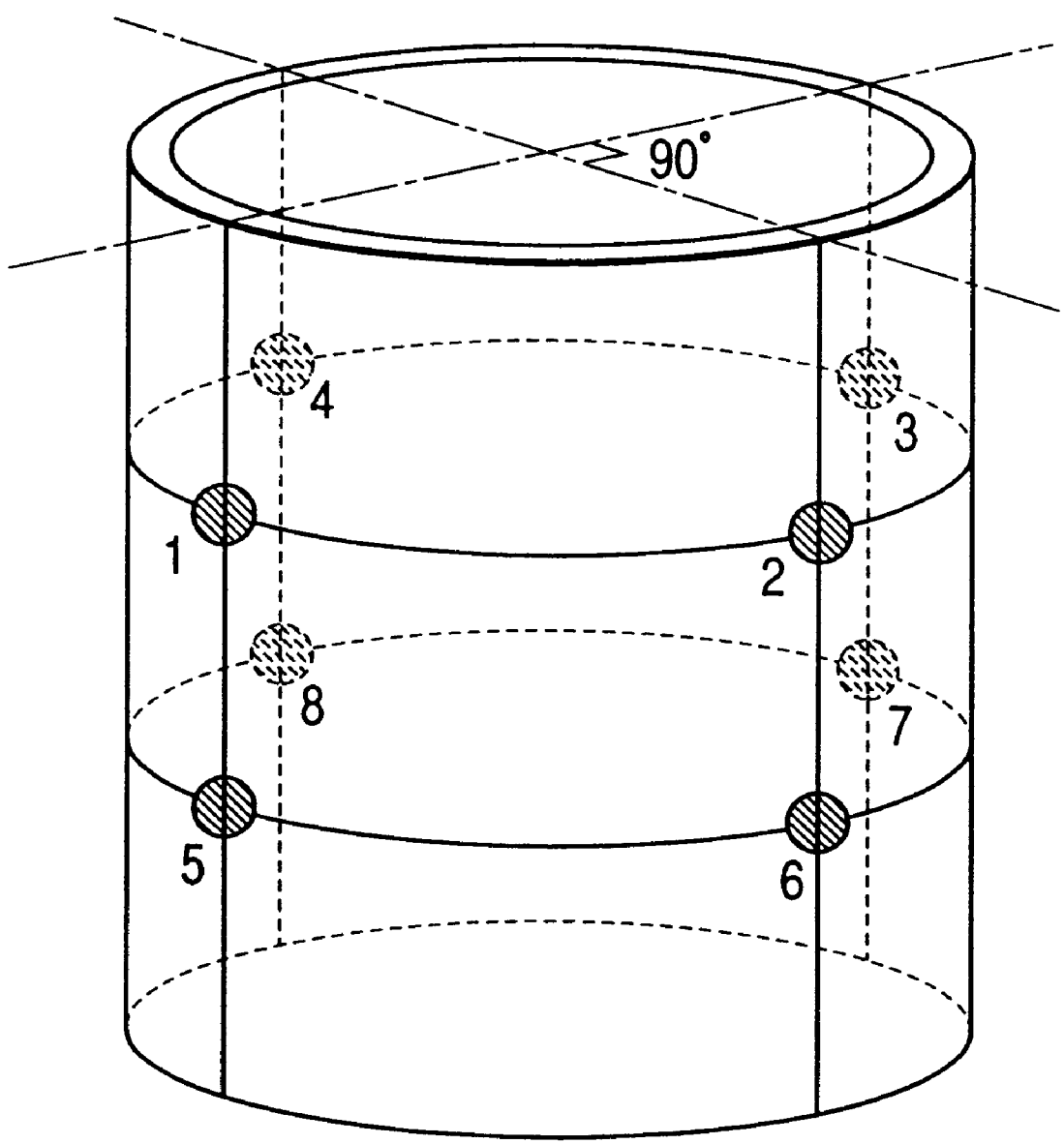
FIG. 7 illustrates positions at which the resistance of an endless belt is measured.

The average value of volume resistance of the intermediate transfer belt (1) was 4.5×10$^6$ Ω. The average value of surface resistance was 1.2×10$^7$ Ω. Also, using the electrical resistance measuring apparatus described previously, a voltage of 100 V was applied to measure the electrical resistance of the intermediate transfer belt (1) at four spots in its peripheral direction and at two spots in its axial direction at each position of the former, eight spots in total, as shown in FIG. 7, and scattering of volume resistance and surface resistance in the belt was examined, where the scattering of measurements at the eight spots was within one figure. Scattering of wall thickness at the same positions was within 150 $\mu$m plus-minus 20 $\mu$m.

Upon visual observation of the intermediate transfer belt (1), none of foreign matter or faulty extrusion such as granular structure and fish eyes was seen on its surface.

This intermediate transfer belt (1) was set in the full-color electrophotographic apparatus shown in FIG. 5, and full-color images were printed on 80 g/m$^2$ paper to measure transfer efficiencies; the transfer efficiencies being defined as follows:

Primary transfer efficiency (efficiency of transfer from photosensitive drum to intermediate transfer belt)= toner image density on intermediate transfer belt/ (transfer residual toner image density on photosensitive drum+toner image density on intermediate transfer belt)

Secondary transfer efficiency (efficiency of transfer from intermediate transfer belt to paper)=image density on paper/(image density on paper+transfer residual toner image density on intermediate transfer belt)

In the present Example, an organic photosensitive drum the outermost layer of which contained PTFE fine powder was used as the photosensitive drum 1. Hence, a high primary transfer efficiency was attained. The primary transfer efficiency and the secondary transfer efficiency were 94% and 90%, respectively. Incidentally, the intermediate transfer belt was cleaned by a cleaning-at-primary-transfer method in which an elastic roller having a resistance of 1×10$^8$ Ω was used as the charging member for cleaning.

Good images were obtainable from the beginning without causing any uneven image density ascribable to non-uniform resistance of the belt, and without causing any color drift (faulty registration of colors) or faulty cleaning ascribable to elongation set of the belt even after running on 50,000 sheets. Moreover, any filming of toner did not occur on the belt surface and the same surface properties as the initial ones remained unchanged without causing any crazing, scrape and wear.

EXAMPLE 2

| Polycarbonate resin | 85 parts |
|---|---|
| Nylon resin | 15 parts |
| Conductive tin oxide | 19 parts |
| Lithium perchlorate | 1.2 parts |
| Antioxidant | 0.5 parts |

The above materials were kneaded and dispersed by means of a twin-screw extrusion kneader to obtain a uniformly kneaded, extrusion material (2). Next, using an extrusion die of 115 mm in diameter, the extrusion material was extruded in the same manner as in Example 1 to obtain an intermediate transfer belt (2) of 142 mm in diameter and 120 μm in wall thickness (extrusion ratio: 1.23)

The tensile break strength and breaking extension of the extrusion material (1) were 680 kgf/cm$^2$ and 89%, respectively. Also, its water absorption was 0.52% because of the nylon resin having a relatively high water absorption.

The average value of volume resistance of the intermediate transfer belt (2) was $8.5 \times 10^6$ Ω. The average value of surface resistance was $3.0 \times 10^7$ Ω. The scattering of the volume resistance and surface resistance was within 7 times due to the simultaneous use of ionic conductive resistance control agent.

Next, full-color images were repeatedly reproduced on 50,000 sheets in the same manner as in Example 1 to make a copying test, where any color drift ascribable to the elongation of the belt did not occur, and a high image density attributable to a good transfer efficiency was maintained. Any images with blank areas caused by poor transfer also did not occur. Here, the primary transfer efficiency and the secondary transfer efficiency were 95% and 91%, respectively. Any filming of toner was not seen on the belt surface after the 50,000-sheet running, and also any crazing, folding and scratches did not occur in the belt.

EXAMPLE 3

| Ethylene-vinyl alcohol copolymer resin | 100 parts |
|---|---|
| Carbon black | 18 parts |

The above materials were kneaded and dispersed by means of a twin-screw extrusion kneader to obtain a uniformly kneaded, extrusion material (3).

Next, using an extrusion die of 60 mm in diameter, the extrusion material was extruded in the same manner as in Example 1 to obtain an intermediate transfer belt (3) of 160 mm in diameter and 150 μm in wall thickness (extrusion ratio: 2.67).

The tensile break strength and breaking extension of the extrusion material (3) were 1200 kgf/cm$^2$ and 200%, respectively. Also, its water absorption was 1.85% because of the ethylene-vinyl alcohol copolymer resin having a relatively high water absorption.

The average value of volume resistance of the intermediate transfer belt (3) was $2.5 \times 10^6$ Ω. The average value of surface resistance was $9.0 \times 10^6$ Ω.

Next, full-color images were repeatedly reproduced on 50,000 sheets in the same manner as in Example 1 to make a copying test, where any color drift ascribable to the elongation of the belt did not occur, and a high image density attributable to a good transfer efficiency was maintained. Any images with blank areas caused by poor transfer also did not occur. Here, the primary transfer efficiency and the secondary transfer efficiency were 95% and 93%, respectively. Any filming of toner was not seen on the belt surface after the 50,000-sheet running, and also any crazing, folding and scratches did not occur in the belt.

Comparative Example 1

Extrusion was carried out in the same manner as in Example 1 except that an extrusion die of 50 mm in diameter was used. Thus, an intermediate transfer belt (4) of 160 mm in diameter was obtained (extrusion ratio: 3.20). The average value of volume resistance of the intermediate transfer belt (4) was $5.0 \times 10^6$ Ω. The average value of surface resistance was $2.0 \times 10^7$ Ω. However, the values of the resistances did not converge during the measurement of resistance, showing unstable values. Also, the scattering of resistance in the belt was on the order of two figures or more, where low-resistance areas and high-resistance areas were locally present. Wall thickness unevenness was as great as 105 μm in minimum value and 194 μm in maximum value with respect to the target value of 150 μm.

A copying test was made in the same manner as in Example 1, where local faulty transfer, image density decrease (greatly seen especially when two colors were superimposed) and delicate image blank areas caused by poor transfer occurred from the beginning. Running was made on 50,000 sheets, where the image quality became gradually poorer than the initial level. However, any crazing and scratches ascribable to the running did not occur.

Comparative Example 2

| Polyethylene resin | 30 parts |
|---|---|
| Vinyl chloride resin | 70 parts |
| Conductive carbon black | 8 parts |
| Antioxidant | 0.5 part |

The above materials were kneaded and dispersed by means of a twin-screw extrusion kneader to obtain a uniformly kneaded, extrusion material (4). An intermediate transfer belt was extruded in the same manner as in Example 1 except for using this extrusion material, to obtain an intermediate transfer belt (5) of 160 mm in diameter.

The tensile break strength and breaking extension of the extrusion material (4) were 500 kgf/cm$^2$ and 300%, respectively. Also, its water absorption was 0.15%.

The average value of volume resistance of the intermediate transfer belt (5) was $3.5 \times 10^6$ Ω. The average value of surface resistance was $7.8 \times 10^6$ Ω. However, the values of the resistances did not converge during the measurement of resistance, showing unstable values. Also, the scattering of resistance in the belt was on the order of three figures or more, where low-resistance areas and high-resistance areas were locally present. Wall thickness unevenness was as great as 128 μm in minimum value and 180 μm in maximum value with respect to the target value of 150 μm.

Next, a 50,000-sheet running test was made in the same manner as in Example 1. Although any problem such as color drift did not occur on images at the initial stage, delicate shrinkage and stretching gradually came to be seen in the belt driving after the running was completed on about 30,000 sheets, and color drift on the order of 100 μm occurred when two colors were superimposed. After 50,000-sheet running, a decrease in belt tension was seen which was presumably because the belt became loose. This frequently caused irregular color drift of 300 μm at maximum.

Comparative Example 3

Extrusion material (5) was obtained in the same manner as in Comparative Example 2 except that the resins were replaced with 100 parts of polyethylene resin and 0 part of vinyl chloride resin. The tensile break strength and breaking extension of the extrusion material (5) were 280 kgf/cm$^2$ and 430%, respectively.

After the melt extrusion of the extrusion material (5), scale-up inflation of the extruded product was conducted while air was blown to obtain an intermediate transfer belt (6). Since the dimensional shape of this product was unstable, strain was produced partly on the product surface.

The average value of volume resistance of the intermediate transfer belt (6) was 5.8×10$^6$ Ω. The average value of surface resistance was 2.4×10$^7$ Ω. However, the values of the resistances did not converge during the measurement of resistance, showing unstable values. Also, the scattering of resistance in the belt was on the order of three figures or more, where low-resistance areas and high-resistance areas were locally present. Wall thickness unevenness was as great as 113 μm in minimum value and 184 μm in maximum value with respect to the target value of 150 μm.

Next, the running test was carried out in the same manner as in Example 1, and image blank areas caused by poor transfer occurred which was ascribable to the strain portions. Subsequent copying was not made.

Comparative Example 4

| Polystyrene resin | 100 parts |
| Carbon black | 17 parts |

The above materials were kneaded and dispersed by means of a twin-screw extrusion kneader to obtain a uniformly kneaded extrusion material (6). The tensile break strength and breaking extension of the extrusion material (6) were 230 kgf/cm$^2$ and 25%, respectively. Also, its water absorption was 0.04%.

After the melt extrusion of the extrusion material (6), scale-up inflation of the extruded product was conducted while air was blown to obtain an intermediate transfer belt (7). Since the dimensional shape of this product thus formed was unstable, strain was produced partly on the product surface.

The average value of volume resistance of the intermediate transfer belt (7) was 5.8×10$^6$ Ω. The average value of surface resistance was 2.4×10$^7$ Ω. However, the values of the resistances did not converge during the measurement of resistance, showing unstable values. Also, the scattering of resistance in the belt was on the order of three figures or more, where low-resistance areas and high-resistance areas were locally present. Wall thickness unevenness was as great as 106 μm in minimum value and 191 μm in maximum value with respect to the target value of 150 μm.

Next, the running test was carried out in the same manner as in Example 1, and image blank areas caused by poor transfer occurred which was ascribable to the strain portions. Subsequent copying was not made.

EXAMPLE 4

| Polyethylene terephthalate resin | 100 parts |
| Conductive carbon black | 10 parts |
| Antioxidant | 0.5 part |

The above materials were kneaded by means of a twin-screw extrusion kneader, and the additive such as carbon black was well uniformly dispersed in the resin so as to provide the desired electrical resistance, thus an extrusion material (7) was obtained. This material was further made into a kneaded product having particle diameters of 1 to 2 mm.

The tensile break strength and breaking extension of the extrusion material (7) were 610 kgf/cm$^2$ and 38%, respectively. Also, the water absorption of the extrusion material (7) was 0.09%.

Next, the above kneaded product was put into the hopper 120 of the single-screw extruder 100 shown in FIG. 1, and was extruded while controlling its preset temperature in the range of from 240 to 260° C., to form a melt. The melt was subsequently brought to a cylindrical single-layer extrusion die 140 of 200 mm in die diameter and 1,000 μm in die gap width. Here, the melt discharged through the die discharge end was at a discharge speed of 1 m/min. Then, air was blown from the gas inlet passage 150 while the melt was extruded from the die, to scale-up inflate the extruded product and carry out extrusion while taking off the extruded product at a take-off speed of 4.5 m/min, during which the tubular film thus extruded was continuously cut in the direction perpendicular to its lengthwise direction at intervals of 310 mm to obtain belts. Here, the extrusion ratio was 1.55. As the result, the transfer belt 190 was obtained, which was 310 mm in diameter, 150 μm in wall thickness and 310 mm in belt width as final shape dimensions. This is designated as transfer belt (1).

Using the electrical resistance measuring apparatus described previously, a voltage of 100 V was applied to measure the electrical resistance of the transfer belt (1) at four spots in its peripheral direction and at two spots in its axial direction at each position of the former, eight spots in total, as shown in FIG. 7. As the result, the value of volume resistance was 9.0×10$^9$ Ω on the average and the value of surface resistance was 7.0×10$^{10}$ Ω on the average. Scattering of the volume resistance and surface resistance in the belt was examined, where the scattering of measurements of the resistance at the eight spots was within ten times. Scattering of wall thickness at the same positions was within 150 μm plus-minus 10 μm, since the die gap was broader than the wall thickness of the belt extruded and it was easy to control its layer thickness.

Upon visual observation of the transfer belt (1), none of foreign matter or faulty extrusion such as granular structure and fish eyes was seen on its surface.

This transfer belt (1) was set in the full-color electrophotographic apparatus shown in FIG. 6, and full-color images were printed on 80 g/m$^2$ paper. In the present Example, too, organic photosensitive drums the outermost layers of which contained PTFE fine powder were used as the photosensitive drums. Hence, a transfer efficiency of as high as 94% was attained.

Good images were obtainable from the beginning without causing any uneven image density ascribable to non-uniform resistance of the belt, and without causing any color drift or faulty cleaning ascribable to elongation set of the belt even after running on 50,000 sheets. Moreover, any filming of toner ascribable to transfer belt surface contamination which might occur during the running did not occur and the same surface properties as the initial ones remained unchanged without causing any crazing, scrape and wear.

EXAMPLE 5

| | |
|---|---|
| Polycarbonate resin | 85 parts |
| ABS resin | 15 parts |
| Conductive tin oxide | 18 parts |
| Lithium perchlorate | 1.2 parts |
| Antioxidant | 0.5 part |

The above materials were kneaded by means of a twin-screw extrusion kneader, and the additive such as conductive tin oxide were well uniformly dispersed in the resins so as to provide the desired electrical resistance, thus an extrusion material (8) was obtained. This material was further made into a kneaded product having particle diameters of 1 to 2 mm.

The tensile break strength and breaking extension of the extrusion material (8) were 650 kgf/cm$^2$ and 110%, respectively. Also, the water absorption of the extrusion material (8) was 0.20%.

Next, the above kneaded product was put into the hopper 120 of the single-screw extruder 100 shown in FIG. 1, and was extruded while controlling its preset temperature in the range of from 260 to 280° C., to form a melt. The melt was subsequently brought to a cylindrical single-layer extrusion die 140 of 200 mm in die diameter and 1,000 μm in die gap width. Here, the melt discharged through the die discharge end was at a discharge speed of 1 m/min.

Then, air was blown from the gas inlet passage 150 while the melt was extruded from the die, to scale-up inflate the extruded product and carry out extrusion while taking off the extruded product at a take-off speed of 4.5 m/min, during which the tubular film thus extruded was continuously cut in the direction perpendicular to its lengthwise direction at intervals of 310 mm to obtain belts. Here, the extrusion ratio was 1.55. As the result, the transfer belt 190 was obtained, which was 310 mm in diameter, 150 μm in wall thickness and 310 mm in belt width as final shape dimensions. This is designated as transfer belt (2).

The electrical resistance of the transfer belt (2) was measured in the same way. The value of volume resistance was 7.0×10$^9$ Ω on the average and the value of surface resistance was 3.0×10$^{10}$ Ω on the average. Scattering of the volume resistance and surface resistance in the belt was examined, where the scattering of measurements of the volume resistance and surface resistance at the eight spots was within five times since the ionic conductive resistance control agent was used. Scattering of wall thickness at the same positions was within 150 μm plus-minus 10 μm, since the die gap was broader than the wall thickness of the belt extruded and it was easy to control its layer thickness.

Upon visual observation of the transfer belt (2), none of foreign matter or faulty extrusion such as granular structure and fish eyes was seen on its surface.

This transfer belt (2) was evaluated in the same manner as in Example 4. As the result, good images were obtainable from the beginning without causing any uneven image density ascribable to non-uniform resistance of the belt, and without causing any color drift or faulty cleaning ascribable to elongation set of the belt even after running on 50,000 sheets. Moreover, any filming of toner ascribable to transfer belt surface contamination which might occur during the running did not occur and the same surface properties as the initial ones remained unchanged without causing any crazing, scrape and wear.

EXAMPLE 6

| | |
|---|---|
| Ethylene-vinyl alcohol copolymer resin | 100 parts |
| Conductive tin oxide | 18 parts |
| Lithium perchlorate | 0.5 parts |

The above materials were kneaded by means of a twin-screw extrusion kneader, and the additive such as conductive tin oxide were well uniformly dispersed in the resins so as to provide the desired electrical resistance, thus an extrusion material (9) was obtained. This material was further made into a kneaded product having particle diameters of 1 to 2 mm.

The tensile break strength and breaking extension of the extrusion material (9) were 1170 kgf/cm$^2$ and 230%, respectively. Also, the water absorption of the extrusion material (9) was 1.79%.

Next, the above kneaded product was put into the hopper 120 of the single-screw extruder 100 shown in FIG. 1, and was extruded while controlling its preset temperature in the range of from 260 to 280° C., to form a melt. The melt was subsequently brought to a cylindrical single-layer extrusion die 140 of 120 mm in die diameter and 1,000 μm in die gap width. Here, the melt discharged through the die discharge end was at a discharge speed of 1 m/min.

Then, air was blown from the gas inlet passage 150 while the melt was extruded from the die, to scale-up inflate the extruded product and carry out extrusion while taking off the extruded product at a take-off speed of 4.5 m/min, during which the tubular film thus extruded was continuously cut in the direction perpendicular to its lengthwise direction at intervals of 310 mm to obtain belts. Here, the extrusion ratio was 2.58. As the result, the transfer belt 190 was obtained, which was 310 mm in diameter, 150 μm in wall thickness and 310 mm in belt width as final shape dimensions. This is designated as transfer belt (3).

The value of volume resistance was 1.5×10$^9$ Ω on the average and the value of surface resistance was 9.0×10$^{10}$ Ω on the average. Any scattering of the volume resistance and surface resistance in the belt was examined, where the scattering of measurements of the volume resistance and surface resistance at the eight spots was within five times since the ionic conductive resistance control agent was used. Scattering of wall thickness at the same positions was within 150 μm plus-minus 10 μm, since the die gap was broader than the wall thickness of the belt extruded and it was easy to control its layer thickness.

Upon visual observation of the transfer belt (3), none of foreign matter or faulty extrusion such as granular structure and fish eyes was seen on its surface.

This transfer belt (3) was evaluated in the same manner as in Example 4. As the result, good images were obtainable from the beginning without causing any uneven image density ascribable to non-uniform resistance of the belt, and without causing any color drift or faulty cleaning ascribable to elongation set of the belt even after running on 50,000 sheets. Moreover, any filming of toner ascribable to transfer belt surface contamination which might occur during the running did not occur and the same surface properties as the initial ones remained unchanged without causing any crazing, scrape and wear.

Comparative Example 5

Extrusion was carried out in the same manner as in Example 4 except that a cylindrical single-layer extrusion die 140 of 50 mm in die diameter and 1,000 μm in die gap width was used and the melt was discharged through the die discharge end at a discharge speed of 4 m/min.

Here, the extrusion ratio was 6.20. As the result, the transfer belt 190 was obtained, which was 310 mm in diameter, 150 μm in average wall thickness and 310 mm in belt width as final shape dimensions. This is designated as transfer belt (4).

The electrical resistance of the transfer belt (4) was measured in the same way. The value of volume resistance was $8.5 \times 10^9$ Ω on the average and the value of surface resistance was $5.0 \times 10^{10}$ Ω on the average. Scattering of the volume resistance and surface resistance in the belt was examined, but the values of resistance did not converge during the measurement of resistance, showing unstable values. Also, the scattering of resistance in the belt was on the order of three figures or more, where low-resistance areas and high-resistance areas were locally present. Wall thickness unevenness was as great as 97 μm in minimum value and 210 μm in maximum value with respect to the target value of 150 μm.

A copying test was made in the same manner as in Example 4, where local faulty transfer, image density decrease (greatly seen especially when two colors were superimposed) and very small image blank areas caused by poor transfer occurred from the beginning. The belt was further repeatedly used in 50,000-sheet running, where the image quality became gradually poorer than the initial level. However, any crazing and scratches ascribable to the repeated use did not occur.

Comparative Example 6

| | |
|---|---|
| Polypropylene resin | 100 parts |
| Conductive carbon black | 15 parts |
| Antioxidant | 0.5 part |

The above materials were kneaded by means of a twin-screw extrusion kneader, and the additive such as carbon black was well uniformly dispersed in the resin so as to provide the desired electrical resistance, thus an extrusion material (10) was obtained.

Extrusion was carried out in the same manner as in Example 4 except that the extrusion material (10) was extruded while controlling the preset temperature in the range of from 190 to 200° C. and the diameter of the die was changed to 290 mm and further the extruded product was taken off without blowing any gas and at a take-off speed of 1.0 m/min. The extrusion ratio was 1.00. As the result, the transfer belt 190 was obtained, which was 310 mm in diameter, 150 pum in average wall thickness and 310 mm in belt width as final shape dimensions. This is designated as transfer belt (5).

The tensile break strength and breaking extension of the extrusion material (10) were 410 kgf/cm$^2$ and 350%, respectively. Also, its water absorption was 0.15%.

The electrical resistance of the transfer belt (5) was measured in the same way. The value of volume resistance was $7.0 \times 10^9$ Ω on the average and the value of surface resistance was $6.0 \times 10^{10}$ Ω on the average. Scattering of the volume resistance and surface resistance in the belt was examined, but the values of resistance did not converge during the measurement of resistance, showing unstable values. Also, the scattering of resistance in the belt was on the order of three figures or more, where low-resistance areas and high-resistance areas were locally present. Wall thickness unevenness was as great as 95 μm in minimum value and 213 μm in maximum value with respect to the target value of 150 μm.

A copying test was made in the same manner as in Example 4, where local faulty transfer, image density decrease (greatly seen especially when two colors were superimposed) and very small image blank areas caused by poor transfer occurred from the beginning.

The belt was further repeatedly used in 50,000-sheet running, where fine shrinkage and stretching gradually came to be seen in the belt driving after the running was completed on about 30,000 sheets, and color drift on the order of 100 μm occurred when two colors were superimposed. The belt was repeatedly used up to 50,000 sheets, where the image quality became gradually poorer than the initial level. However, any crazing and scratches ascribable to the repeated use did not occur.

Comparative Example 7

Extrusion material (11) was obtained in the same manner as in Comparative Example 6 except that the polypropylene resin was replaced with 100 parts of an olefin elastomer resin. The tensile break strength and breaking extension of the extrusion material were 140 kgf/cm$^2$ and 870%, respectively. Also, its water absorption was 0.1%.

A transfer belt (6) was obtained in the same manner as in Example 4 except for using the extrusion material (11). The value of volume resistance of the transfer belt (6) was $5.5 \times 10^9$ Ω on the average and the value of surface resistance was $4.5 \times 10^{10}$ Ω on the average. Scattering of the volume resistance and surface resistance in the belt was examined, but the values of resistance did not converge during the measurement of resistance, showing unstable values. Also, the scattering of resistance in the belt was on the order of three figures or more, where low-resistance areas and high-resistance areas were locally present. Wall thickness unevenness was as great as 98 μm in minimum value and 231 μm in maximum value with respect to the target value of 150 μm.

A copying test was made in the same manner as in Example 4, where local faulty transfer, image density decrease (greatly seen especially when two colors were superimposed) and very small image blank areas caused by poor transfer occurred from the beginning.

The belt was further repeatedly used in 50,000-sheet running, where fine shrinkage and stretching gradually came to be seen in the belt driving after the running was completed on about 30,000 sheets, and color drift on the order of 100 μm occurred when two colors were superimposed. The belt was repeatedly used up to 50,000 sheets, where the image quality became gradually poorer than the initial level. However, any crazing and scratches ascribable to the repeated use did not occur.

Comparative Example 8

|  |  |
|---|---|
| Polystyrene resin | 100 parts |
| Carbon black | 15 parts |

The above materials were kneaded and dispersed by means of a twin-screw extrusion kneader to obtain a uniformly kneaded extrusion material (12). The tensile break strength and breaking extension of the extrusion material (12) were 210 kgf/cm$^2$ and 35%, respectively. Also, its water absorption was 0.04%.

After the melt extrusion of the extrusion material (12), scale-up inflation of the extruded product was conducted while air was blown to obtain a transfer belt (7). Since the dimensional shape of this product thus formed was unstable, strain was produced partly on the product surface.

The average value of volume resistance of the transfer belt (7) was 3.9×10$^9$ Ω. The average value of surface resistance was 3.1×10$^{10}$ Ω. However, the values of the resistances did not converge during the measurement of resistance, showing unstable values. Also, the scattering of resistance in the belt was on the order of two figures or more, where low-resistance areas and high-resistance areas were locally present. Wall thickness unevenness was as great as 122 µm in minimum value and 214 µm in maximum value with respect to the target value of 150 µm.

Next, the running test was carried out in the same manner as in Example 4, and image blank areas caused by poor transfer occurred which was ascribable to the strain portions. Subsequent copying was not made.

What is claimed is:

1. A process for producing an endless belt, comprising:

the step of melt-extruding an extrusion material into a cylinder by means of an extruder, said extrusion material having a tensile break strength of 400 kgf/cm$^2$ or above and a breaking extension of from 3.0% to 250%, and being extruded in an extrusion ratio of from 1.05 to 2.80 by blowing a gas to the inside of the melt-extruded cylindrical product while being melt-extruded; and the step of cutting the melt-extruded cylindrical to form an endless belt.

2. A process according to claim 1, wherein said step of melt-extruding the extrusion material includes extruding the material from a circular die, and where the endless belt formed has a wall thickness which is smaller than a die gap of the circular die.

3. A process according to claim 1, wherein the extrusion material has a water absorption of 1.9% or less.

4. A process according to claim 1, wherein the endless belt is an intermediate transfer belt.

5. A process according to claim 1, wherein the endless belt is a transfer belt.

6. A process according to claim 1, wherein the endless belt has a wall thickness of 45 to 300 µm.

7. A process according to claim 1, wherein the endless belt has a volume resistance of 10$^0$ to 10$^{14}$ Ω.

8. A process according to claim 1, wherein the endless belt has a surface resistance of 10$^0$ to 10$^{17}$ Ω.

* * * * *